United States Patent
Assarpour

(10) Patent No.: US 9,086,950 B2
(45) Date of Patent: Jul. 21, 2015

(54) METHOD FOR HEAP MANAGEMENT

(71) Applicant: Avaya, Inc., Basking Ridge, NJ (US)

(72) Inventor: Hamid Assarpour, Arlington, MA (US)

(73) Assignee: AVAYA INC., Basking Ridge, NJ (US)

( * ) Notice: Subject to any disclaimer, the term of this patent is extended or adjusted under 35 U.S.C. 154(b) by 171 days.

(21) Appl. No.: 13/627,714

(22) Filed: Sep. 26, 2012

(65) Prior Publication Data

US 2014/0089625 A1    Mar. 27, 2014

(51) Int. Cl.
*G06F 12/00* (2006.01)
*G06F 12/02* (2006.01)

(52) U.S. Cl.
CPC ................................ *G06F 12/023* (2013.01)

(58) Field of Classification Search
CPC ... G06F 12/023; G06F 12/0246; G06F 12/00; G06F 12/02; G06F 3/067; G06F 9/5016
USPC .................................................. 711/170, 171
See application file for complete search history.

(56) References Cited

U.S. PATENT DOCUMENTS

| | | | |
|---|---|---|---|
| 6,088,777 A * | 7/2000 | Sorber | 711/171 |
| 6,175,900 B1 * | 1/2001 | Forin et al. | 711/156 |
| 6,182,089 B1 * | 1/2001 | Ganapathy et al. | 1/1 |
| 6,490,670 B1 * | 12/2002 | Collins et al. | 711/173 |
| 6,594,749 B1 * | 7/2003 | Czajkowski | 711/170 |
| 2005/0273568 A1 * | 12/2005 | Blandy | 711/170 |
| 2009/0271581 A1 * | 10/2009 | Hinrichs, Jr. | 711/162 |
| 2010/0205374 A1 * | 8/2010 | Meka et al. | 711/117 |
| 2011/0113194 A1 * | 5/2011 | Terry et al. | 711/114 |
| 2011/0246742 A1 * | 10/2011 | Kogen et al. | 711/170 |

* cited by examiner

*Primary Examiner* — Brian Peugh
*Assistant Examiner* — Edmund Kwong
(74) *Attorney, Agent, or Firm* — Anderson Gorecki & Rouille LLP

(57) ABSTRACT

A bitmask array is implemented as a two dimensional bit array where each bit represents an allocated/free cell of the heap. Groups of bits of the bitmask array are assigned to implement commonly sized memory cell allocation requests. The heap manager keeps track of allocations by keeping separate lists of which groups are being used to implement commonly sized memory cell allocations requests by maintaining linked lists according to the number of cells allocated per request. Each list contains a list of the bit groups that have been used to provide allocations for particularly sized requests. By maintaining lists based on allocation size, the heap manager is able to cause new allocation requests to be matched up with previously retired allocations of the same size. Memory may be dynamically allocated between lists of differently sized memory requests.

13 Claims, 3 Drawing Sheets

METHOD FOR HEAP MANAGEMENT

CROSS-REFERENCE TO RELATED APPLICATIONS

None.

BACKGROUND

1. Field

This application relates to network elements and, more particularly, to a method for highly efficient heap management.

2. Description of the Related Art

Data communication networks may include various switches, nodes, routers, and other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

Network elements are designed to handle packets of data efficiently to minimize the amount of delay associated with transmission of the data on the network. Conventionally, this is implemented by using hardware in a data plane of the network element to forward packets of data, while using software in a control plane of the network element to configure the network element to cooperate with other network elements on the network. For example, a network element may include a routing process, which runs in the control plane, that enables the network element to have a synchronized view of the network topology so that the network element is able to forward packets of data across the network toward its intended destination. Multiple processes may be running in the control plane to enable the network element to interact with other network elements on the network and forward data packets on the network.

The applications running in the control plane make decisions about how particular types of traffic should be handled by the network element to allow packets of data to be properly forwarded on the network. As these decisions are made, the control plane programs the hardware in the dataplane to enable the dataplane to be adjusted to properly handle traffic as it is received. The data plane includes ASICs, FPGAs, and other hardware elements designed to receive packets of data, perform lookup operations on specified fields of packet headers, and make forwarding decisions as to how the packet should be transmitted on the network. Lookup operations are typically implemented using tables and registers containing entries populated by the control plane.

Both the control plane and the data plane use memory to store tables and other values in connection with implementing forwarding decisions. To manage the memory, a heap manager is required which keeps track of which memory addresses are currently in use and which are available.

A heap is a pre-allocated contiguous chunk of memory that is used by application tables to dynamically allocate and free data within the course of their runtime operations. The heap is divided into basic units of usage, which are referred to herein as "memory cells" or "cells" for short. A cell can be configured to have a size that is 1× or multiple of the size of the underlying physical memory location. For example, assume that the underlying memory has a memory cell size of 4 bytes. Memory would then be allocated to include 4 bytes, 8 bytes, 12 bytes, or another number of contiguous 4 byte cells. Typically, the cell size is selected such that it optimizes and makes efficient use of the underlying physical memory.

The heap labels its constituent cells by a zero-based identifier called a Cell Index. A data structure keeps track of free cells, and is maintained by the heap manager. When an application requires data storage in its course of execution, it dynamically requests one or more cell indexes from the heap manager. The heap manager uses the data structure to find one or more contiguous open cells and returns a single cell index to the application. If the application requested one cell, then the heap manager returns a single index. If, on the other hand, the application requests more than one cell, then the heap manager tries to find the requested number of contiguous cell indexes to enable a contiguous block of memory to be allocated to the application. Once the heap manager finds a block of memory that is the correct size, it will return the cell index of the first cell to the application. The application will write its data to the memory starting at the starting index and the heap manager will update the cell index data structure to indicate that the associated cells have been allocated.

The data structure that is used to store the cell indexes, and keep track of free and occupied cells, represents overhead. For example, current solutions have an overhead, on average, anywhere from 8 to 28 bytes per memory allocation. Since each memory allocation results in allocation of one or more cells, if all memory allocations are a single cell, then the overhead is huge.

Since memory ranges of cells may be allocated, and then subsequently released, the memory tends to become fragmented meaning that allocated cells are interspersed with unallocated cells. For example, if an application requests and is allocated two cells, and subsequently releases the two cells, those two available cells may not be contiguous with another available cell. Hence, the two cells would not be available to be allocated in response to a request by another application for an allocation of four cells. Fragmentation thus can make memory regions effectively unavailable for use in fulfilling subsequent requests, even though technically the cells are not in use and hence should be available. Defragmentation is very difficult, since moving memory allocations involves reallocating memory locations to the applications.

A heap manager thus aims to minimize memory footprint required per cell index data structure (minimize overhead), to minimize fragmentation, and to minimize the search time to allocate or free cells. This last aim is associated with performance—it is desirable to use a heap management scheme that is able to efficiently find the next free index when a memory allocation is received so that the heap manager is not a bottleneck in memory performance.

Unfortunately, existing heap managers fall short in one or more of these categories. For example, many current solutions use extensive overhead to try to optimize placement of allocations within existing memory allocations to minimize fragmentation of the heap. Other solutions use a simple linked list keep track of open memory cells, which allows for reduced overhead but can cause extensive fragmentation. Accordingly, it would be advantageous to provide a highly efficient heap management scheme.

SUMMARY OF THE DISCLOSURE

The following Summary, and the Abstract set forth at the end of this application, are provided herein to introduce some concepts discussed in the Detailed Description below. The Summary and Abstract sections are not comprehensive and are not intended to delineate the scope of protectable subject matter which is set forth by the claims presented below.

A bitmask array is implemented as a two dimensional bit array where each bit represents an allocated/free cell of the heap. The bitmask array includes i rows, each of which is r bits wide. Each bit in the bitmask array is accessed via a cell index. The cell index is n bits long (n=i+r). The first i bits of the entry identify the row of the bitmask array and the second n bits identify the index in that row to specify which of the bits within the row should be read.

The heap manager keeps track of allocations by keeping separate lists according to the number of cells allocated per request. Each list contains a list of bitmask IDs that have been used to provide allocations for particularly sized requests. By maintaining lists based on allocation size, the heap manager is able to cause new allocation requests to be matched up with previously retired allocations of the same size. Memory may be dynamically allocated between lists of differently sized memory requests.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

Figure 1:
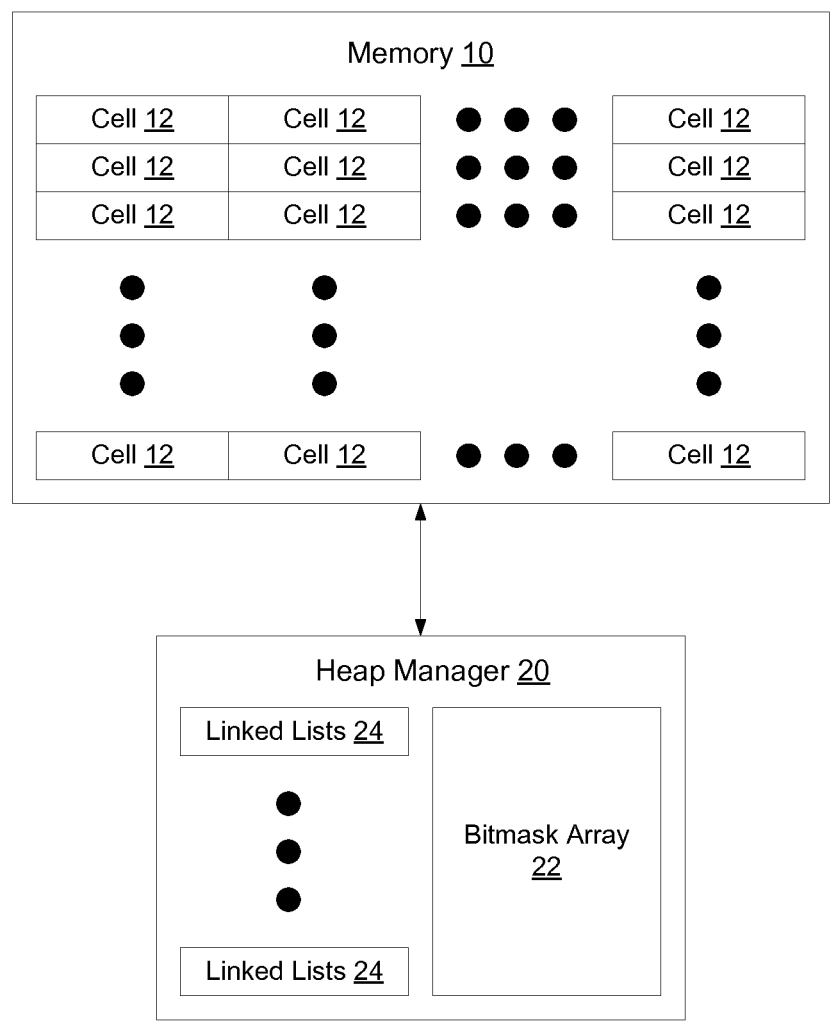
FIG. 1 is a functional block diagram of an example memory system for use in a network element.

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to an embodiment, a bitmask array is implemented as a two dimensional bit array where each bit represents an allocated/free cell of the heap. The bit is zero if the cell is available and is one if the cell is allocated. Although this is a preferred embodiment, these values could be reversed as well. The bitmask array includes i entries (rows), each of which is r bits wide. Thus, the number of entries in the bitmask array=i×r, which also equals the number of cells in the heap.

Each bit in the bitmask array is accessed via a cell index. The cell index is n bits long, where n=i+r. The index includes a bitmask ID (i) value (upper i-bit field) identifying which of the i entries in the bitmask array should be selected, as well as a bitmask offset (r) value (lower r-bit field) identifying which of the bits within the bitmask array entry should be read. The cell index thus identifies the row of the bitmask array using the bitmask ID (i) value, as well as the location within the row using the bitmask offset (r) value.

The heap manager keeps track of allocations by keeping separate lists according to the number of cells allocated per request. For example, the heap manager has a first list identifying cells allocated for requests that required a single cell to be allocated. The heap manager has a second list identifying cells allocated in connection with requests for two cells to be allocated. Thus, for example, if the heap manager allows an application to request up to 16 contiguous cells, the heap manager would maintain 16 lists, one list for each allocation size. Likewise, if the heap manager allows an application to request up to 64 contiguous cells, the heap manager would maintain 64 lists, one list for each allocation size.

Each list contains a list of bitmask IDs (associated with rows in the bitmask array) that have been used to provide allocations for particularly sized requests. By maintaining a list of bitmask IDs that are used, on an allocation size basis, the heap manager is able to cause new allocation requests to be matched up with previously retired allocations of the same size. For example, if a previous allocation for 14 consecutive cells is released, and a new request for allocation of 14 consecutive cells is received, the heap manager can look at the list used to allocate requests that are size 14 (used to allocate 14 consecutive cells) and cause the newly received request to be inserted into the previously freed 14 consecutive cells.

To allow the memory to be dynamically allocated between lists associated with differently sized allocation requests, the heap manager maintains a Free List. The free list is a linked list of free bitmask IDs in which no entries have been allocated. As the size specific lists require additional bitmask IDs, bitmask IDs are obtained from the Free List. Thus, for example, if the heap manager receives a request for 8 consecutive memory spots, and the list (partially allocated linked list) associated with request size 8 is empty, an available bitmask ID may be obtained from the Free List. bitmask IDs are returned to the free list once all allocated cells have been freed, i.e. no entries continue to be allocated. This allows the memory in the heap to be dynamically allocated between the differently sized memory requests according to the volume of requests for particular sizes of contiguous memory cells.

To accelerate locating available cells, in one embodiment each of the lists is implemented using two linked lists—a partially allocated linked list and a fully allocated linked list. A fully allocated linked list is a list of bitmask IDs that have been fully allocated such that no set of bits of the required field size exist within the bitmask array in the associated row. The partially allocated linked list is a list of bitmask IDs that have at least some bits allocated to requests associated with the required field size, but in which additional requests of the required size could be accommodated. Separating the fully allocated bitmask IDs from the partially allocated bitmask IDs allows the heap manager to ignore the fully allocated bitmask IDs when looking for free memory locations to optimize search performance.

When an entry in the fully allocated linked list is freed, the bitmask ID is updated and moved if necessary to cause the Bitmask ID to be added to the correct list based on its new status. For example, an allocation may require the bitmask ID to be moved from the fully allocated linked list to the partially allocated linked list. Likewise, when all of the entries in a bitmask ID in the partially allocated linked list are allocated, the bitmask ID is moved from the partially allocated linked list to the fully allocated linked list.

In one embodiment, the heap manager is implemented as a software module that lives within a virtual layer software infrastructure. Its design is based on a multi-context, fully parameterized, schema database driven architecture with highly efficient memory footprint and optimized search time. The goal is to provide a single software code that is used for heap management for all application needs. Applications can invoke the heap manager through the following Virtual Layer APIs:

vl_vtIndex_getIndex(uint32 vt_id, uint32 cellIndexCnt, uint32*startingCellIndex)

vl_vtIndex_freeIndex(uint32 vt_id, uint32 startingCellIndex)

A middleware layer within the virtual layer software infrastructure marshals the required data structures and arguments for that particular heap context, and calls either a get index function or a free index function to the heap. In response to receipt of these functions, the heap will either return a free index to be allocated to the memory request or will free an identified index.

In one implementation, the overhead per allocated cell may average of 3 bits per cell index. Furthermore, memory fragmentation may be reduced to less than 5% and in some cases to 1% of the total available cell memory. It also limits the search time for finding the next available free cell index to less than $2^r$ where $2^{(i+r)}$ is the total number of cell indices.

FIG. 1 illustrates an example memory and heap management system according to an embodiment. As shown in FIG. 1, memory 10 includes cells 12 which are basic units of storage. For example, each cell may include 4 or 8 bytes of physical memory. Other cell sizes may be implemented as well and the invention is not limited to an implementation utilizing a particular cell size. When an application (not shown) requires storage, the application will request one or more cells depending on the amount of storage required. A heap manager 20 keeps track of which memory cells have been allocated and which memory cells are not in use. In response to a request for memory allocation, the heap manager will locate a contiguous set of cells that is available (not currently being used to store data for an application) and will return a cell index identifying the location in memory where the application should begin to write the data.

The heap manager, according to an embodiment, includes a bitmask array 22 having one bit that identifies each cell in the memory. If the bit for a memory cell is zero, the memory cell is currently not allocated. If the bit in the bitmask array has a value of one, the memory cell has been allocated and thus is unavailable. A set of linked lists 24 keeps track of groups of bits which of the bitmask array. The groups of bits, in one embodiment, may be implemented as rows of the bitmask array. The linked lists keep track of which groups are free, partially allocated, or fully allocated, and are implemented on a per-cell count basis such that memory requests for differently sized allocations (different numbers of memory cells) are stored in different linked lists. By implementing linked lists for differently sized memory allocation requests, new requests for memory allocation can easily be matched with retired memory allocations of the same size to minimize fragmentation of the memory.

Figure 2:
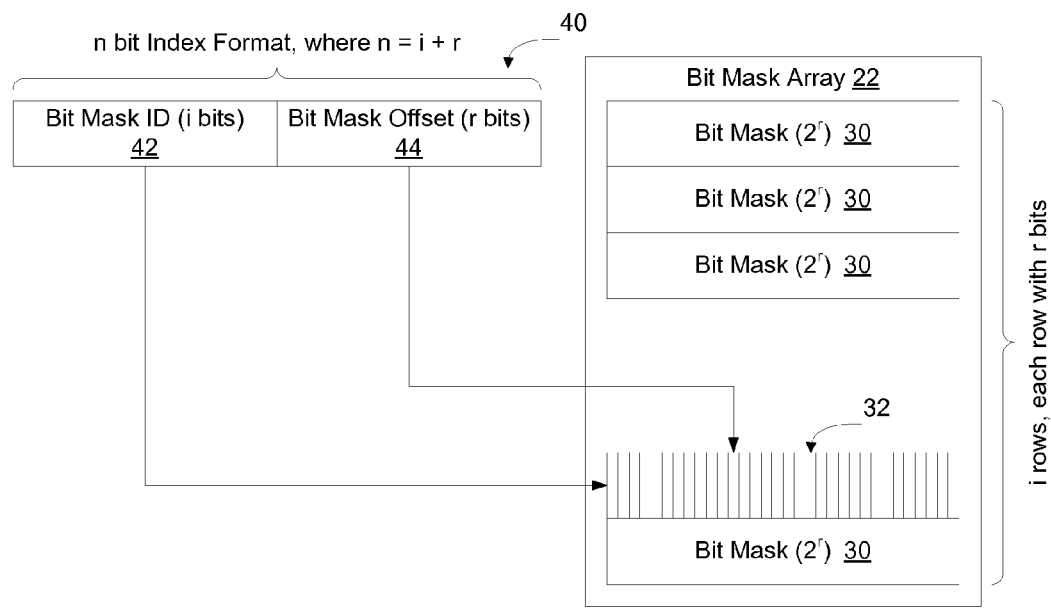
FIG. 2 is a functional block diagram of a bitmask array of an example heap manager according to an embodiment.

FIG. 2 shows an example bitmask array. For convenience, an embodiment will be described in which the logical groups of bits are implemented as rows. Other embodiments may be implemented using different logical groupings of bits. As shown in FIG. 2, in this embodiment the bitmask array has a plurality of rows 30, each of which contains a number of bits 32. Each bit corresponds to one of the cells of memory 10. In the illustrated example, the bitmask array includes i rows, each of which contains r bits. The bitmask array is thus of size i×r. Note, that the one to one correspondence between bits in the bitmask array and cells in the memory need not have a spatial/physical correlation but rather is simply a way of keeping track of available and allocated memory cells. Thus, for example, if the memory is physically implemented as a 32 byte wide memory divided into 4 byte cells, the bitmask array 22 would not be limited to having 8 bit rows. Rather, the bitmask array may be implemented to use any desired width to optimize allocation of memory cells to application requests.

Each bit of the bitmask array is able to be identified using an n bit index 40. The n bit index includes two values: a bitmask ID 42 (i bits) identifying the row of the bitmask array, and a bitmask offset 44 (r bits) identifying the particular bit within the row that is of interest. The n bit index thus is able to specify via the first i bits which row of the bitmask array should be read, and the second r bits specify which one or more values within the row are of interest. As used herein, the term "bitmask ID" will refer to a logical grouping of bits of the bitmask array. Although the preferred embodiment utilizes rows of the bitmask array as an example logical grouping of bits, the invention is not limited in this manner as other logical groupings of bits (e.g. columns) may be identified by bitmask IDs.

Figure 3:
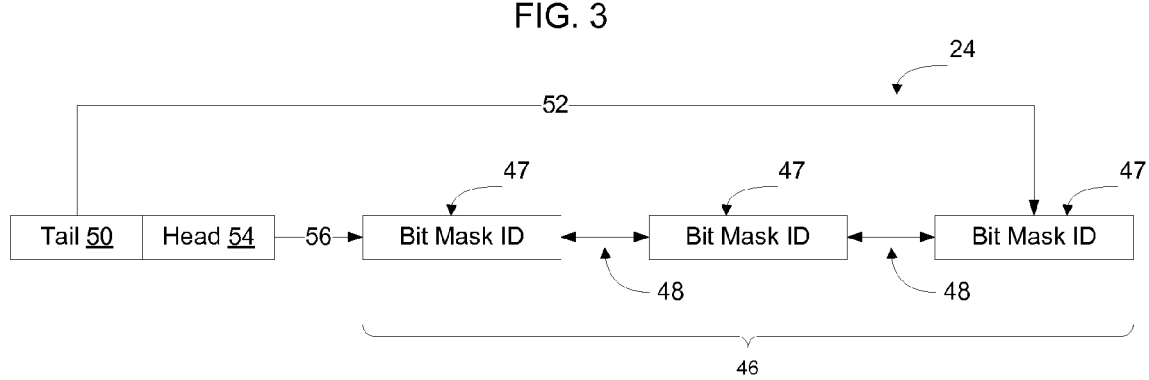
FIG. 3 is a functional block diagram of an example linked list.

FIG. 3 illustrates an example linked list 24. A linked list is a data structure including a group 46 of nodes which together represent a sequence. Each node in the linked list includes a value 47 as well as a reference 48 which acts as a link to the next node in the sequence. In the example shown in FIG. 3, the linked list 24 includes a tail entry 50 containing a pointer 52 to the last element in the list and a head entry 54 containing a pointer 56 identifying the first element in the list. Each node in the set of linked nodes contains as a value 47 one of the bitmask IDs and contains a pointer 48 to the next node in the linked list.

Figure 4:
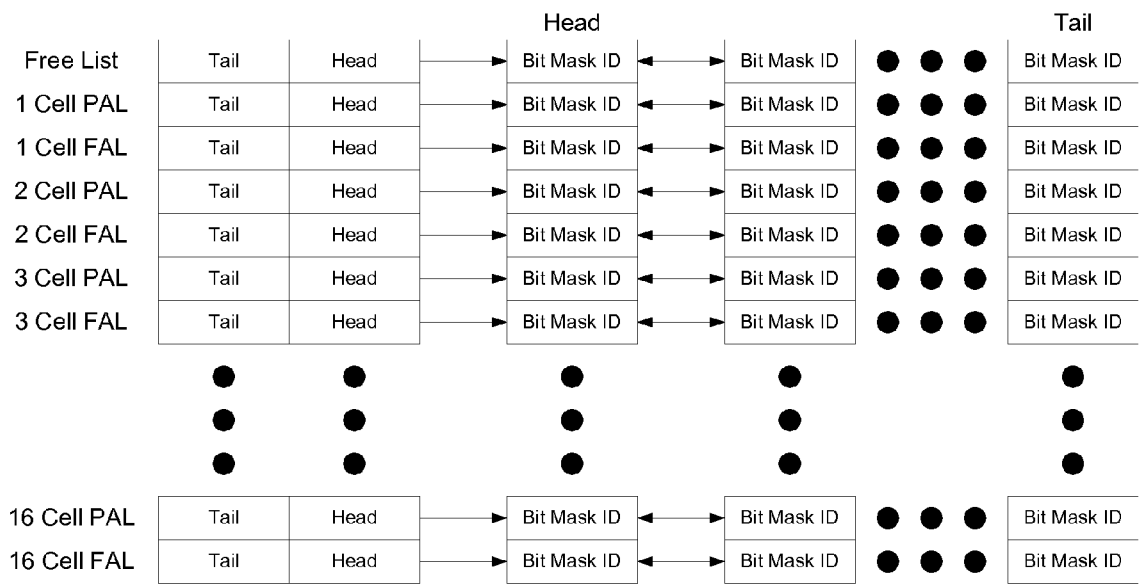
FIG. 4 is a functional block diagram of a set of linked lists maintained by a heap manager according to an embodiment.
Figure 5:
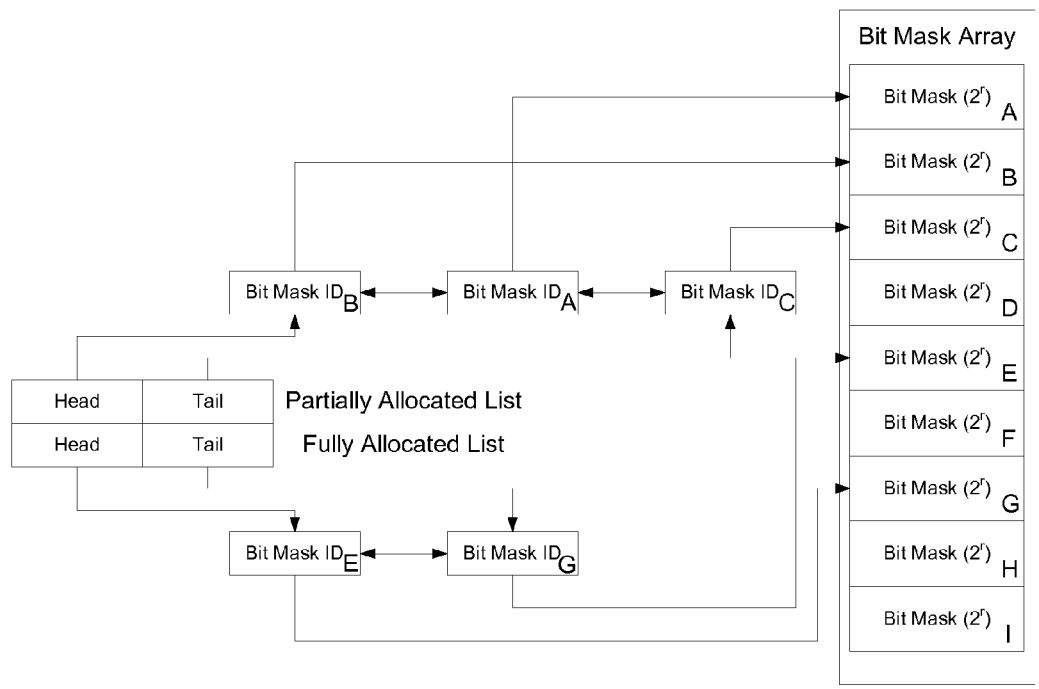
FIG. 5 is a functional block diagram of a pair of linked lists of the set of linked lists of FIG. 4 according to an embodiment.

FIG. 4 shows an example set of linked lists that may be implemented by the heap manager 20 according to an embodiment. FIG. 5 shows a pair of linked lists in greater detail. As shown in FIG. 4, the heap manager includes a free list containing a set of bitmask IDs (rows of the bitmask array) which have not been allocated to any of the other linked lists. The heap manager also includes a pair of linked lists for each size of memory allocation supported by the heap. Specifically, according to an embodiment, the heap manager will separately keep track of memory allocations using separate linked lists per memory allocation size, according to the number of cells requested in the memory request. For example, a memory request may include a request for 1, 2, 3, 4, etc. contiguous cells of memory. The heap manager maintains pair of linked lists for each sized memory request so that the different sized memory requests are individually tracked using separate linked lists.

In the example shown in FIG. 4, assume that the heap manger supports memory request for memory allocations of between 1 and 16 cells. A first set of linked lists is used to keep track of 1 cell memory requests. In FIG. 4, the first set of linked lists is identified as 1 cell Partially Allocated Linked list (1 cell PAL) and as 1 cell Fully Allocated Linked list (1 cell FAL). Similarly, a second set of linked lists—2 Cell PAL and 2 Cell FAL—is used to keep track of 2 cell memory allocations. Similar sets of linked lists are used to keep track of 3 cell memory allocations up to the maximum supported limit of 16 cell memory allocations. The heap may support larger numbers of memory cell allocations as well.

Each pair of linked lists includes two linked lists—a fully allocated linked list (FAL) and a partially allocated linked list (PAL). Each entry in each of these linked lists contains, as a value, a bitmask ID. Stated differently, each row of the bitmask array will be allocated to one of the linked lists and requests for memory of the particular size associated with the set of linked lists will be made from that row. The partially allocated linked list references rows of the bitmask array which have been partially allocated, and in which additional allocations may be made. The fully allocated linked list references rows of the bitmask array in which additional memory allocations may not be made.

A bitmask ID may be placed in the fully allocated linked list whenever a set of contiguous memory addresses of the required size is not available within the group of cells associated with the bitmask ID. For example, assume that a bitmask ID has 64 cells, and that the bitmask ID is being used to implement 10 cell memory requests. When 6 requests have been fulfilled, 60 of the 64 cells will have been allocated from the bitmask ID and 4 cells will remain unallocated. At this point no additional 10 cell memory requests may be allocated memory from the bitmask ID since 60 of the 64 cells have been allocated. Thus, the bitmask ID will be moved to the fully allocated list even though there is a small fraction of available cells that could have been used to allocate memory requests for smaller sized memory requests.

FIG. 5 shows graphically how the linked lists may be used to manage memory according to an embodiment. In the example shown in FIG. 5, it will be assumed that the pair of linked lists is associated with allocating memory requests that are 2 cells in length. The other pairs of linked lists associated with other length memory requests would operate in exactly the same manner, and the 2 cell length value was arbitrarily chosen to help explain operation of the pair of linked lists.

As shown in FIG. 5, the pair of linked lists includes a partially allocated linked list and a fully allocated linked list. The PAL, in this example, includes references to bitmask ID B, A, and C. The head of the partially allocated linked list contains a pointer to the head element which references bitmask B. The tail of the partially allocated linked list contains a pointer to the tail element which references bitmask C.

When a new request is received which requires a memory allocation that is 2 memory cells long, the heap manager will allocate memory by finding available memory for the memory request. To do this, the heap manager identifies the first bitmask ID associated with the head of the partially allocated linked list and reads the row of the bitmask array to determine which memory locations are available. The heap manager will allocate two consecutive memory locations within that row and change the corresponding bit values of the allocation bits in that bitmask array from zero to one. The memory allocation (e.g. starting cell index) will then be returned to the application that submitted the request. In the illustrated example, the bitmask ID at the head of the partially allocated linked list referenced bitmask ID B. Accordingly, the allocations will be made from memory locations associated with bitmask ID B.

Assume now that all memory locations within bitmask ID B, with the exception of the two that were just allocated, were previously allocated in connection with other memory requests. The allocation of memory in connection with the request would cause all of the available memory managed by the row of the bitmask array to be allocated to memory requests. Accordingly, the entry (bitmask ID B) will be removed from the partially allocated linked list and added to the fully allocated linked list. The head pointer of the partially allocated list would then be updated to point to bitmask ID A, and the head/tail pointers of the fully allocated list would similarly be updated. Separating the partially allocated linked list and fully allocated linked list optimizes searching for available memory by eliminating the need for the heap manager to search for memory locations within rows of the bitmask array when the rows are fully allocated. As rows become fully allocated they are thus moved from the partially allocated list to the fully allocated list. As memory is freed within an bitmask ID within the fully allocated list, the bitmask ID will be moved back to the partially allocated list.

In this way, memory may be allocated to requests. Specifically, as a request is received, the heap manager determines the size of the memory request and uses the linked lists for the memory allocation size to search for available memory to fulfill the request. As memory is released, the memory allocation within the is likewise located and released.

Grouping memory allocation requests according to size allows similarly sized memory allocations to be easily matched with sets of contiguous memory locations as memory is released. Specifically, as applications release memory, the released memory will cause bits within the bitmask array in the linked list for the memory allocation size to be changed so that the memory may once again be allocated. By grouping all memory allocations according to size, and keeping track of which groups of bits (e.g. rows) of the bitmask array were used to implement memory allocations of a particular size, it is possible to quickly find a contiguous set of memory locations for a memory request without causing fragmentation.

For example, assume a row of the bitmask array includes 54 bits (numbered 0-53), and that the row has been allocated to service memory requests 8 cells in length. As memory requests are received the cells within the row will be allocated sequentially, 8 at a time. The following table I shows the row of bitmask array when a first request is received. The top row in this table describes the content of the bitmask array and the bottom row shows the bit value of the row in the bitmask array:

TABLE I

| Request 1 Cells 0-7 | unallocated Cells 8-15 | unallocated Cells 16-23 | unallocated Cells 24-31 | unallocated Cells 32-39 | unallocated Cells 40-47 | unallocated Cells 48-53 |
|---|---|---|---|---|---|---|
| 11111111 | 00000000 | 00000000 | 00000000 | 00000000 | 00000000 | 00000000 |

As additional requests of size 8 are received, they may be allocated memory from this bitmask ID. During this time, the bitmask ID is referenced by an entry in the Partially Allocated List for requests of size 8, which facilitates finding the row of the bitmask array that is being used to allocate 8 cell memory allocations. The following table II shows the row of the bitmask array once sufficient memory requests have been received such that additional memory allocations may not be implemented out of the row of the bitmask array:

TABLE II

| Request 1 Cells 0-7 | Request 2 Cells 8-15 | Request 3 Cells 16-23 | Request 4 Cells 24-31 | Request 5 Cells 32-39 | Request 6 Cells 40-47 | Request 7 Cells 48-53 |
|---|---|---|---|---|---|---|
| 11111111 | 11111111 | 11111111 | 11111111 | 11111111 | 11111111 | 11111111 |

At this point in time, the row is fully allocated, and will be moved from the partially allocated linked list to the fully allocated linked list. Moving the entry to the fully allocated linked list allows the heap manager to ignore that row when looking for available memory locations which optimizes finding contiguous sets of memory locations for new memory allocations.

Now assume that the application which was allocated memory in connection with request 4 no longer needs to store information at that location in memory. For example, the heap manager may receive a request to release the memory previously allocated to request 4. In connection with releasing the memory, the heap manager will cause the bits in the bitmask array that had been allocated to request 4 to be reset to zero. Further, the bitmask ID will be moved from the fully allocated list to the partially allocated list to allow the heap manager to search the row of the bitmask array when subsequent memory allocations requiring 8 contiguous cells are subsequently received. Table III shows the row of the bitmask array once request 4 is released:

TABLE III

| Request 1 Cells 0-7 | Request 2 Cells 8-15 | Request 3 Cells 16-23 | unallocated Cells 24-31 | Request 5 Cells 32-39 | Request 6 Cells 40-47 | Request 7 Cells 48-53 |
|---|---|---|---|---|---|---|
| 11111111 | 11111111 | 11111111 | 00000000 | 11111111 | 11111111 | 11111111 |

Assume now that a subsequent request (request 8) is received which has requested 8 contiguous cells. The heap manager will access the partially allocated list for 8 cell memory allocations and perform a search in the bitmask array, at the row identified by the bitmask ID, to determine a set of 8 contiguous memory locations. In this example, the heap manager will perform the search in the row of the bitmask array shown above in Table III and determine that cells 24-31 are currently not allocated. Accordingly, the heap manager will allocate this set of 8 cells and update the bitmask array to indicate that these memory cells have been allocated. Table IV shows the row of the bitmask array once request 8 has been allocated memory by the heap manager:

TABLE IV

| Request 1 Cells 0-7 | Request 2 Cells 8-15 | Request 3 Cells 16-23 | Request 8 Cells 24-31 | Request 5 Cells 32-39 | Request 6 Cells 40-47 | Request 7 Cells 48-53 |
|---|---|---|---|---|---|---|
| 11111111 | 11111111 | 11111111 | 11111111 | 11111111 | 11111111 | 11111111 |

Of course, the actual bitmask (as noted above) is actually a series of zeros and ones. The bitmask does not include an identity of the request that caused allocation of memory as indicated in tables I-IV. Rather, this was done to help visually explain how requests of a given size, when allocated out of rows of the bitmask array, are able to be allocated memory, release memory, and have memory reallocated without experiencing any fragmentation within the memory.

Referring back to FIG. 5, partially allocated linked list includes bitmask IDs B, A, and C. Fully Allocated Linked List includes bitmask IDs G and E. If a request is received, the heap manager will look at the row of the bitmask array identified by the bitmask ID at the head of the partially allocated linked list and allocate a contiguous set of memory locations from the row associated with bitmask ID B. If that causes the row to be fully allocated, bitmask ID B will be moved to the fully allocated linked list. If the row is not fully allocated, bitmask ID B will remain within the partially allocated linked list.

The heap manager also includes a free list implemented as a linked list of bitmask IDs which have not been allocated to any of the partially allocated or fully allocated linked lists. As memory is freed, a given row within the bitmask array associated with a bitmask ID may become fully available. At that point, the bitmask ID is removed from the partially allocated list and moved to the free list.

Similarly, a request may be received by the heap manager and the partially allocated linked list for the request size may be empty. When this happens, the heap manager may obtain a bitmask ID from the free list, add the bitmask ID to the partially allocated list, and use the row of the bitmask array associated with the retrieved bitmask ID to allocate memory to the request.

By allotting bitmask IDs from the free list to the various size specific linked lists as requests are received, the heap manager is able to allocate memory to requests on a size basis without predetermining, in advance, the relative proportions of different sized memory requests. This allows the heap manager to dynamically allocate memory between memory allocations of different sizes without requiring a fixed amount of memory to be allocated to any particular set of anticipated memory allocation requests.

The heap manger described herein is based on a multi-context, fully parameterized, schema-database driven architecture with highly efficient memory footprint and optimized search time. The heap manager operates in connection with a middleware layer that marshals the required data structures and arguments for the particular heap context.

As noted above, the bitmask ID is an index into the bitmask array, and causes one of the logical associations of bitmask entries in the bitmask array to be selected. A bitmask ID has two dynamic states—free or allocated. A bitmask ID is free if its associated bitmask is zero (all entries are zero), and the bitmask ID state is allocated if its associated bitmask is non-zero.

A free bitmask ID is always kept in the free list. This allows the logical association of bitmask entries to be allocated to a memory size specific linked list when one of the memory size specific linked lists requires additional memory to fulfill a request. When all the cell indices within a bitmask are freed, the state of the bitmask ID is set to free and the associated bitmask ID is put back on the free list.

Additionally, the heap manger maintains an array where each of its entries holds the header data structure for the partially and fully allocated linked lists of bitmask IDs. The header data structure essentially maintains the first (head) and last (tail) bitmask IDs for each list. the body of the lists are actually maintained in a separate array which is indexed by bitmask ID. The partially and fully allocated linked lists are initially empty, and all the available linked bitmask IDs are populated in the free list.

When an application requests one or more cell indexes, the cell count requested in the request is used to index into the header data structure to determine the bitmask ID at the head of the partially allocated list for the cell count value. If the selected partially allocated list is empty, then the next available bitmask ID is popped from the free list and pushed into the PAL. If the selected PAL is not empty, then the first entry in its list is guaranteed to satisfy the request. In this case, the associated bitmask is searched to return the starting cell index to the application. If a bitmask ID in the PAL becomes fully allocated, then it is removed from the PAL and pushed into the FAL.

When an application returns the starting cell index, the supplied bitmask ID is used to clear the cell indices in the corresponding bitmask. In this case, if the bitmask ID was in the FA:, then it is removed and pushed into the PAL. Further, if the bitmask ID was in the PAL and as a result of the free operation its bitmask became all zeros, the bitmask ID is removed from the PAL and put back into the free list.

Accordingly, in one embodiment, by maintaining the header data information in an array, the physical location of the entry in this array dictates the allocation type. For instance, entry 5 in the array indicates that all the bitmask IDs in the list at this entry allocate 5+1 contiguous cell indices per request (assuming a zero based integer array). Thus, entry 0 would be used to hold single cell requests, and entry 7 would be used to allocate 8 contiguous cell indices per request. Thus, if the array has 32 entries, then the maximum number of allocatable contiguous cells is 32.

In one embodiment, a separate array may be implemented which is indexed according to bitmask ID and maintains the body of all of the PALs, FALs, and the free list. Each entry in this array includes a cell index count identifying the cell index count to identify the PAL/FAL with which the entry is associated, a previous bitmask ID and a subsequent bitmask ID in the linked list, and an allocated cell counter representing the number of allocated cell indices in that bitmask. Further, the entry includes a bitmask offset which is used to remember the last freed cell index in the corresponding bitmask. The array index value indicates the type of the allocated bitmask ID—i.e. the cell index count or the number of contiguous cell indices assigned to this bitmask ID.

The functions described herein may be embodied as a software program implemented in control logic on a processor on the network element or may be configured as a FPGA or other processing unit on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible non-transitory computer-readable medium such as a random access memory, cache memory, read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for heap management, the method comprising the steps of:
   implementing a bitmap in which each bit in the bitmap represents a memory cell of the heap;
   forming logical groups of bits from the bitmap, each of the logical groups of bits representing an area of the heap sufficiently large to be used to allocate memory cells in response to multiple memory allocation requests;
   implementing a set of memory size specific linked lists, each of the linked lists referencing sets of the logical groups of bits that are being used to allocate memory cells from the heap for differently sized memory cell allocation requests;
   implementing a free linked list referencing a subset of the logical groups of bits that are not referenced in any of the set of memory size specific linked lists; and
   dynamically moving logical groups of bits from the free linked list to the sets of memory size specific linked lists as needed;
   moving one of the logical groups of bits from one of the set of memory size specific linked lists to the free linked list when no memory cells are allocated from memory cells associated with the one of the logical groups of bits;
   wherein the logical groups of bits are predetermined size groups of contiguous bits of the bitmap.

2. The method of claim 1, wherein the logical groups of bits are rows of the bitmap.

3. The method of claim 1, wherein the set of memory size specific linked lists includes:
   a first memory size specific linked list used to allocate memory cells for memory cell allocation requests for one memory cell;
   a second memory size specific linked list used to allocate memory cells for memory cell allocation requests for two memory cells; and
   a third memory size specific linked list used to allocate memory cells for memory cell allocation requests for three memory cells.

4. The method of claim 1, wherein the set of memory size specific linked lists includes m memory size specific linked lists, each of the m memory size specific linked lists being used to allocate memory cells for memory cell allocation requests for a respective memory cell allocation size between 1 and m memory cells.

5. The method of claim 1, wherein each of the memory size specific linked lists includes a partially allocated linked list and a fully allocated linked list, the partially allocated linked list including references to groups of bits representing memory cells from which a group of contiguous memory cells of the respective memory cell allocation size exists, and the fully allocated linked list including references to groups of bits representing memory cells from which a group of contiguous memory cells of the respective memory cell allocation size is not available.

6. A method of heap management, comprising:
receiving a request for memory allocation, the request having a size indicating a number of contiguous memory cells required to fulfill the request;
accessing a data structure specific to the size and containing references to logical groups of memory cells used by a heap management system to fulfill requests only of the size; and
determining whether a set of contiguous memory cells of the size requested is available from one of the logical groups of memory cells referenced by the data structure;
if the set of contiguous memory cells of the size requested is available from the one of the logical groups of memory cells referenced by the data structure, then allocating the set of contiguous memory cells of the size requested from the one of the logical groups of memory cells; and
if none of the logical groups of memory cells referenced by the data structure has an available set of contiguous memory cells of the size requested, then allocating an additional logical group of memory cells to the data structure, and allocating the set of contiguous memory cells of the size requested from the additional logical group of memory cells;
wherein each of the logical groups of memory cells represents an area of the heap sufficiently large to be used to allocate memory cells in response to multiple memory allocation requests;
wherein the data structure containing references to logical groups of memory cells is a linked list referencing logical groups of bits of a bitmap in which each bit of the bitmap is used to identify a memory cell of the heap; and
wherein the logical groups of bits are predetermined size groups of contiguous bits of the bitmap.

7. The method of claim 6, wherein the heap management system maintains a separate data structure for each size request supported by the heap management system to separately keep track of memory allocations according to the sizes of the memory allocation requests.

8. The method of claim 6, wherein the logical groups of bits are rows of the bitmap.

9. A method of keeping track of memory allocations according to memory allocation request size, the method comprising the steps of:
implementing a bitmap array in which each bit of the bitmap array corresponds with a cell of memory;
maintaining a set of size specific data structures, each size specific data structure being used to keep track of portions of memory that are allocated in response to memory allocation requests of a respective unique memory allocation request size;
maintaining a free data structure, the free data structure being used to keep track of portions of memory that are not allocated to any of the size specific data structure in the set of size specific data structures;
dynamically moving references to portions of memory from the free data structure to the size specific data structures in the set of size specific data structures as the size specific data structures in the set of size specific data structures require access to additional memory; and
dynamically moving references to portions of memory from the size specific data structures in the set of size specific data structures to the free data structure when no memory allocations are associated with the portions of memory; and
upon receipt of a memory allocation request:
determining a size of the memory allocation request, and
allocating memory in response to the memory allocation request from the portion of memory associated with the size specific data structure being used to keep track of memory allocationa requests of the memory allocation request size;
wherein each of the portions of memory represents an area of the memory sufficiently large to be used to allocate memory cells in response to multiple memory allocation requests;
wherein each size specific data structure keeps track of a portion of memory by referencing logical groups of bits of the bitmap array; and
wherein the logical groups of bits are predetermined size groups of contiguous bits of the bitmap array.

10. The method of claim 9, wherein the logical groups of bits are rows of the bitmap array.

11. The method of claim 9, wherein each data structure is a linked list of logical groups of bits of the bitmap array.

12. The method of claim 11, wherein each size specific data structure includes a partially allocated linked list and a fully allocated linked list, the partially allocated linked list containing a linked list of logical groups of bits of the bitmap array in which contiguous sets of bits of the size is available to be used to allocate memory for a memory for the request size, and the fully allocated linked list containing a linked list of logical groups of bits of the bitmap array in which no contiguous sets of bits of the size is available to be used to allocate memory for a memory for the request size.

13. The method of claim 12, further comprising moving one of the logical groups of bits of the bitmap array from the fully allocated linked list to the partially allocated linked list upon release of memory previously allocated from memory associated with the one of the logical groups of bits of the bitmap array.

* * * * *